Dec. 20, 1949     H. W. JONKHOFF     2,491,613
VEHICLE TRUCK
Filed May 15, 1944     3 Sheets-Sheet 1
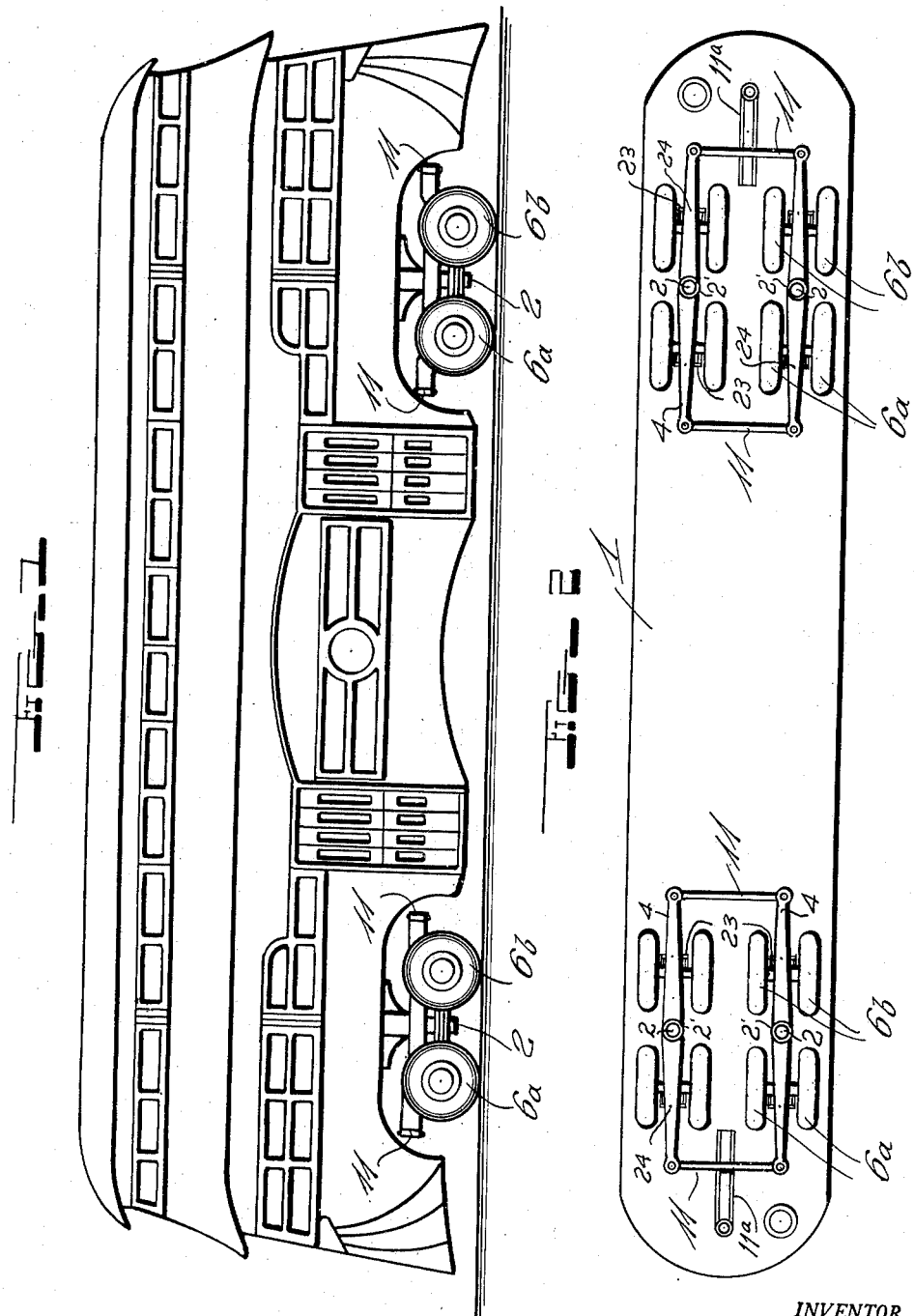
INVENTOR.
Henri W. Jonkhoff,
BY
ATTORNEY

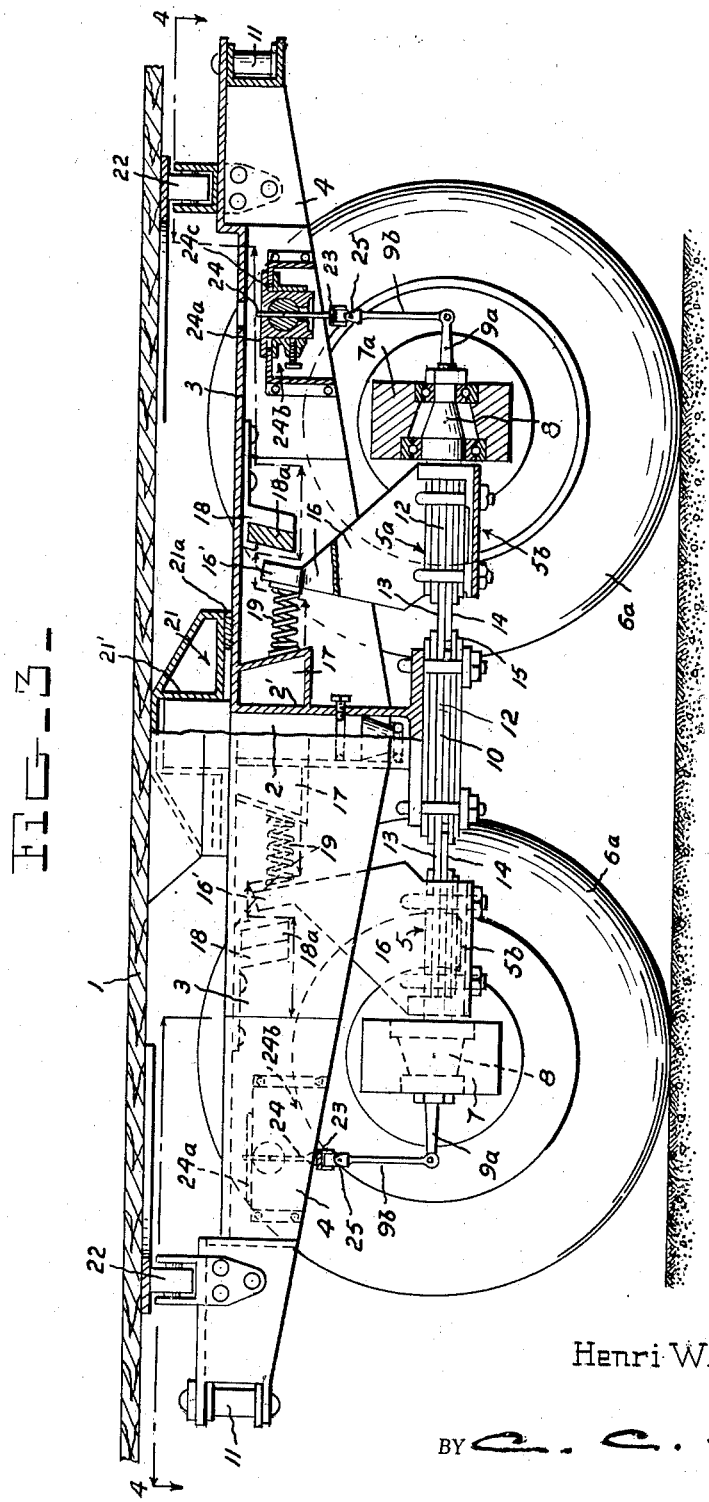

Dec. 20, 1949 H. W. JONKHOFF 2,491,613
VEHICLE TRUCK
Filed May 15, 1944 3 Sheets-Sheet 3
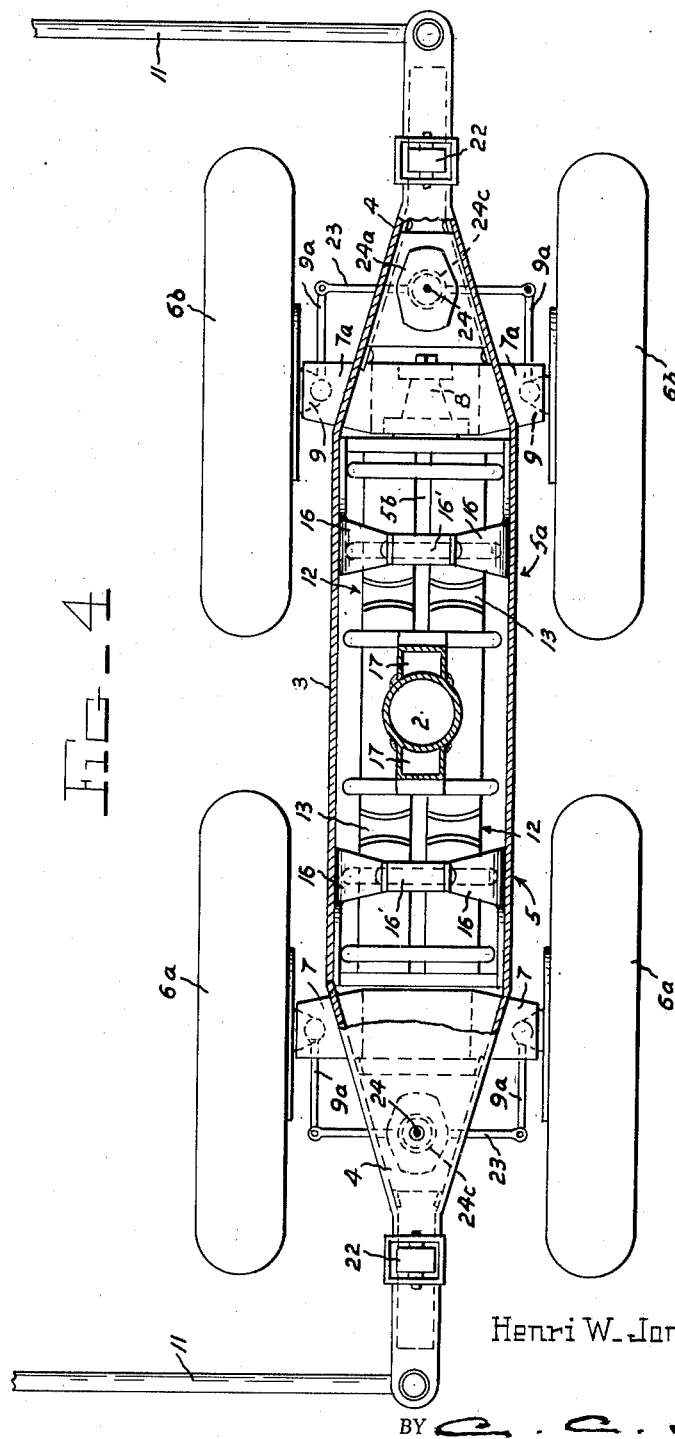
INVENTOR:
Henri W. Jonkhoff,
Deceased,
BY
ATTORNEY.

Patented Dec. 20, 1949

2,491,613

UNITED STATES PATENT OFFICE 2,491,613

VEHICLE TRUCK

Henri W. Jonkhoff, New York, N. Y.; Ainsworth B. Blood and Stanleigh P. Friedman executors of said Henri W. Jonkhoff, deceased Application May 15, 1944, Serial No. 535,669

7 Claims. (Cl. 280—81.5)

In some of my former patents, covering multi-wheeled constructions, use has been made of two parallel truck chassis, each pivotally connected to a cross beam on the platform of the vehicle, especially for road vehicles having steering wheels.

The invention now aims at a further improvement of said arrangement, better balancing and facilitating the control of parallel half trucks against deviation from a proper line of travel when the wheels encounter obstacles in their paths of travel. Instead of in the middle between the right and left wheels, now the central pin of each truck chassis can be mounted on the platform substantially in the same vertical plane as its wheels.

Said central pins are not just pivotal connections, but they transmit horizontal power, exerted by the platform, pushing the truck chassis in a forward direction. Like a wheel can turn around its axis, so can the truck chassis turn around its central pin, but in doing so it meanwhile changes its direction.

When a wheel of a conventional centrally pivoted truck strikes even a small obstacle in its path, the speeding wheel jumps vertically up in the air and in doing so the wheel looses its traction grip, and the additional resistance created by the impact with the obstacle, offsets the balance of direction, which is very sensitive due to the minimum rolling resistance on smooth surfaces. Consequently, the wheel does not come down in a vertical way, but forcefully is pushed outwards horizontally and it is prevented from settling down to proper running position so that a deviation of the vehicle from its designed line of travel is liable to occur.

The cause for it is not so much the obstacle but the deviating power exerted by the central pin of the truck chassis and transmitted to the lifted wheel under a sideward angle of 40 to 50 degrees.

According to my present invention, in using parallel half trucks or wheeled side truck sections, each pivoted to the vehicle platform, the central pivot pin of each half truck can be located in the longitudinal center line of the half-truck frame beam carrying the front and rear wheels and be connected to the vehicle platform at a point substantially in the same vertical plane as the wheels. The forwarding power, exerted by said central pivot, is thus transmitted to the wheels in the direct line of travel and there will be no tendency to push the wheel sidewards in case of a vertical jump. This arrangement, therefore, may reduce the number of accidents to a considerable extent.

The stability in functioning of two parallel half trucks depends on their continuous parallelism. The invention now provides for an interconnection which ties the half trucks together, still leaving them free to take up positions deviating from the direction of the platform. To that end the chassis of the half trucks are made to form the side sections of a parallelogram of which the two cross sections are pivotally connected to the side sections, making the parallelogram flexible and suceptible to deformation or transformation during the rounding of curves, without disturbing the parallelism between each pair of the side- and each pair of the cross-sections. The parallelogram now forms a flexible frame, of which the side sections consist of the half truck chassis, each of which is carried by a pedestal 2' pivotally connected to the cross beam on the platform by means of a central or king pin 2.

The two half trucks are supported by front and rear wheels each carried by an arm on its outer end, the inner part of said arm being pivotally or flexibly connected to the truck chassis so as to allow for vertical movement of the wheel and a springing device can be introduced to control said vertical movement.

The flexible parallelogram frame, being horizontal and parallel to the vehicle platform, can have a turntable. Or it may have rollers inserted between the platform and said frame to sustain the king pin in its function.

The accompanying drawings illustrate examples as well for road vehicles as for railway cars of how the invention can be applied. In road vehicles, instead of one wheel, a pair of front wheels and a pair of rear wheels may be provided, each pair carried on a common axle, pivotally connected to the wheel carrying arm, so as to provide for balancing and/or steering movements. In the so-called maximum traction truck system, two wheels may be carried by the one arm and one wheel by the other arm, in which case the king pin is moved away from its central position between the front and rear wheel axles.

In the drawings an outline of an eight wheel parallelogram truck frame is shown, each truck consisting of two parallel four wheeled bogies, each bogie being rigidly connected to a side section of the truck frame, each of said side sections being pivotally connected to a cross beam on the platform.

In the accompanying drawings:

Figure 1 is a side elevation of a car equipped with my invention.

Figure 2 is a top plan view of four trucks embodying my invention, the body of a car being shown in outline.

Figure 3 is a view in side elevation, with parts in vertical section, of my improved truck and a portion of a car.

Figure 4 is an irregular sectional plan view of the truck, the section being taken substantially on line 4—4 of Figure 3, the cushioning springs being omitted in order to more clearly show the underlying portions of the laminated spring.

In the drawings the reference numeral 1 designates a platform carrying a pair of laterally spaced king pins 2, coupling thereto the side members or sections of a frame construction 3, having the form of a flexible parallelogram of which the side members sections 4 in their middle carry the bearing for said king pins for horizontal swinging movement, and carry a laminated spring 10 having arms 5, 5a extending outwardly and inwardly or forwardly and rearwardly, respectively, from the pedestal 2' and wherein the outer or front pair of wheels 6a are carried on a transverse or cross axle 7, pivotally connected at 8 to the outer end of the forwardly extending arm 5, allowing for rocking movement of said cross axle in the square of the arm. In a similar way the inner or rear wheels 6b are mounted on a cross axle 7a at the outer end of the rearwardly extending arm 5a. The same applies to each side member of the frame and all the wheels in the drawing are pivotally mounted at the ends of the cross axle so as to be steerable in respect to the said axles. The arms carrying the cross axles are flexibly connected to the chassis 4 by the laminated spring 10 based on the chassis 4 and preferably fixed to the lower end of the pedestal 2', which spring resists vertical movement of said arms. The side members of the parallelogram truck frame, at their outer ends, are connected pivotally to each other by means of rigid cross members 11, said two cross members forming parts of the parallelogram and allow for different parallelogram formation of the flexible truck frame, in which the side members 4 and wheel carrying arms 5 and 5a at all times are kept parallel to each other. Because all four sections of the parallelogram frame always move in a horizontal plane parallel to the platform, there may be either a turntable device 21, or rollers 22, or both, between the platform and the side members of the frame 3 so as to support the bearings of the king pin 2. As shown, the turntable 21 consists of a hollow upper turntable member 21' carried by the body 1 or a bolster fixed thereto and a lower turntable member 21a fixed to the frame member 4 or to the upper end of a hollow pedestal 2' fastened to the frame member 4. The king pins 2 are fitted at their upper ends in the turntable members 21' and extend downwardly through the turntable members 21a and are fitted at their lower ends in the pedestal 2'. It will be understood that the truck frame can be used to carry electromotors, or other means, transmitting power to the wheels 6a and 6b in self-propelled vehicles. The use of this truck in road vehicles makes it possible to take curves at high speed because on the curve the supporting wheels practically represent a wider track on account of the angular position of the truck in respect to the platform. The middle part of the platform and the weight of its load automatically moves to the inside of the curve, forming an overhang of weight and thus eliminating the tendency of the vehicle from turning over towards the outside of the curve.

The usual type of spring, now used in heavy vehicles, is very clumsy, heavy and costly and my new invention aims at a more economical application of spring blades so as to save material and reduce weight and cost. Therefore, an inner base type suspension of springs is presented, whereby under similar conditions the amount of action, required from the spring elements, is greatly reduced. As illustrated in the drawings, this action of the spring 10 now takes place in the main blade 12, far inside the wheel base, somewhere midway between the spring seat and the wheel axle 7 or 7a, which is carried by a rigid free end part or extension of each spring arm. This rigid part, acting as a lever, permits vertical movement of the wheel axle at its outer end, proportionate to the length of the extension, so that vertical movement of the wheel can be kept normal, meanwhile reducing the length and the weight of the spring considerably.

As can be seen in the drawings, the blades of the laminated spring are assembled in such a way that only one blade 12 extends throughout the full length of the spring and forms an uninterrupted connection between the frame 4 and both wheel carrying arms 5, 5a allowing for a limited flexibility at point 13, the blades at the points 13 of the arms forming fulcra on which the arms may move up and down. Furthermore, in the drawing, the central or main blade 12 above and below is supported by other spring blades except for the short free distance at each point 13 where said main blade is supported underneath only by a blade 14, based on the wheel arm and extending between the main blade 12 and a minor blade 15, so that it can slide between the two blades and allow for bending at point 13. The use of such secondary spring blades can be multiplied, for instance, another one can be placed on top of the main blade to add resistance against deformation of the main blade and so as to counterbalance the effect, caused by the application of brakes.

So as to limit the stresses and so as to eliminate any twisting of the spring blades, the wheel carrying part of each arm, the blades of which are rigidly held assembled by clamping a bracket 5b, is provided with a friction shock absorbing and bumper carrying member comprising a fastening plate secured in place by the clips which clamp the bracket 5b to the spring leaves, which fastening plate is provided with cheek plates 16 extending upwardly between the depending walls or flanges of the frame member 4 and frictionally engaging the same. These cheek plates guide the spring arm in its upward and downward movements and oppose a certain degree of frictional resistance to such movements. They also serve to prevent the arm from twisting or having any other undesirable lateral movements, so that the arm will always move upward and down in a true vertical path. In using pivoted trucks and in making all the wheels steerable as shown in the diagram, the effect of the momentum inside the under carriage is greatly reduced. The top stop part 16' of the mounting member 16 is disposed between two stops 17 and 18, limiting the vertical movement of the wheel arm in regard to the frame. The stops 17 carry coil springs 19 which press the mounting part away towards stops 18 carrying bumpers each consisting of a rubber block or other material 18a. The drawing shows the position of the mounting member under load. This device protects the spring blades in the laminated spring from overstrain and it controls the amount of vertical movement allowed to the wheel arm.

Another feature to reduce the action of the laminated spring is the rocking cross axles 7 and 7a. Usually the ability of a vehicle spring is misunderstood and this leads to many failures in the application of springs. It has been proved impossible to have one spring do all the functions required, especially where heavy loads are involved. Therefore, a vehicle, made sprung for heavy loads, usually is not fit to carry passengers when it is nearly empty and riding over rough roads. Usually this leads to excessive requirements for road upkeep. An empty truck, made sprung for heavy loads, forms in its totality an unsprung mass which includes the weight supported by the springs which do not work by lack of load. It is quite clear that, relatively spoken, the effect on the road surface will be less disastrous when the same truck, instead of being empty, is loaded, for such reduces the amount of unsprung weight which in its effect submits the road surface to real hammer blows.

In the drawings all the truck wheels 6a, 6b are mounted in pairs on the outer ends of rocking cross axles 7, 7a pivotally connected to the wheel carrying arms 5, 5a centrally of their length to swing or oscillate vertically on spindles 8 extending longitudinally of the truck frame and of the vehicle. In the case of steering wheels, the wheel axle spindles or knuckles are pivoted to the ends of the axles, as shown at 9, and provided with crank arms 9a pivoted to lever arms 9b which are coupled by universal joint connections 25 to the ends of transverse connecting rods or bars 23, each bar 23 thus connecting the crank arms 9a of the adjacent wheels 6a or 6b to swing in unison. As shown, each bar 23 has fixed thereto centrally of its length a shaft or spindle 24 extending upwardly therefrom and connected to the adjacent end of the frame beam 3 to move laterally with the beam, so that when the two beams of the truck are swung laterally in one direction or the other by movement of the actuating link bar or rod 11 steering movements in one direction or the other will be imparted to the wheels of the truck coupled by its steering rod or bar 23 to the actuating link. As shown, all the wheels are steerable and the steering rods or bars 23 between each pair of crank arms 9a maintain the wheels of each pair parallel with each other in any of their positions. Each shaft 24, as shown, may be coupled to the beam 3 in any suitable manner to adapt it to swing with the beam and shift to accommodate itself to the various movements of the beam while at the same time transmitting steering movements to the wheels when the beam moves laterally in one direction or the other. To this end the shaft may be mounted in a knuckle-joint bearing 24a in which it may slide vertically, rotate axially and tilt universally, which bearing is mounted on a bridge plate 24b extending between and secured to the flanges 4 of the beam 3, the bearing 24a extending through a slot 24c in the bridge plate and being slidable in said slot longitudinally and transversely of and relatively to the beam.

Various methods of steering may be employed. In the use of the trucks on a trailer linked to a tractor vehicle, for example, primary steering is effected by the steering gear of the tractor and the steering of the trailer or trailers (if more than one trailer is being drawn) is automatic, the swing of the trailer bodies causing transformation of the truck frames, whereby the truck wheels of the trailers are turned to follow the path of the tractor.

In steering a self-propelled car, such as shown in Figure 1, a suitable steering element operated by a conventional steering wheel and gearing on the car may be coupled to the forward transverse member 11 of the truck at the front end of the car whereby the frame members of the truck at that end may be swung to right or left to transmit steering movements to the wheels carried by such truck. In the event that the vehicle is steered in this manner the truck at the rear end end of the car may be allowed to turn freely, as it will be shifted by the lateral movements of the car body to effect automatic steering of its wheels. If the car is intended to be driven with either end foremost duplicate steering elements and steering gear of the character described may be provided at the opposite ends of the car and coupled to the respective trucks, whereby the truck at either end of the car may be manually steered and the truck at the opposite end of the car allowed to steer itself, or suitable steering gear to positively steer both trucks simultaneously may be provided. Also in practice the wheels may be positively steered if desired by transmitting steering motion to their shafts 24 or connecting rods 23 by suitable steering means other than that described, and the wheels of each truck frame may be linked together to positively turn in unison when the truck frames are turned by the use of linkage connections of known type. I have not deemed it necessary to show any complete system of manually controlled steering means, as any suitable means for the purpose may be employed, and as a steering mechanism per se forms no part of my present invention except to the extent of coupling the wheels pivoted to each axle for conjoint steering movements.

In the drawings the rocking wheel axles each carrying a pair of balanced wheels, are introduced in addition to the springing device as described before. In doing so, the lift of one wheel causes the wheel carrying arm to be lifted only by half the amount of the vertical wheel movement and the springing device, therefore, has to take up only half the amount of lift. A heavy spring is not effective to absorb small vibrations. Once the spring in a heavily loaded car is stressed, it loses its ability for quick action needed to absorb minor vibrations of the wheel. The rocking axle instead responds immediately on any such minor movements for it acts as a balancing lever and in handling such minor wheel vibrations no deformation in the material is involved, which means saving power. It has been proven that the road resistance per ton weight on rough roads in some cases could be reduced by 15 and 20 per cent by using vehicles built along these lines. Therefore, the combination of a laminated spring and balanced wheels mounted on a rocking cross axle seems to be ideal. It confines the vertical movements, caused by the unevenness of the road surface, to the smallest possible part of the vehicle, forming the unsprung weight. In such constructions it is possible to keep all such vertical movements away from the platform making it practically stable. This saves considerable power, otherwise wasted in causing such movements in the large sprung weight of the mass embodying the platform and its load.

Contrary to the general opinion, the platform of a heavy truck can be made sprung just as well in an empty as in a loaded condition. This opens many possibilities for the use of ambulance roadtrains and for the mass transportation of much bulky and fragile merchandise which up to now can be moved only in small vans specially designed for that purpose. Mass transportation is 30 to 40 per cent cheaper per ton-mile than the transport by small units.

In case there should be needed for an increase of the capacity of the spring, some of the additional pairs of spring blades extending toward the middle part of the main blade can be made of different lengths in such a way that the space between the approaching pairs does not coincide with the middle of the main blade, but that the longer one of the pair overlaps and sustains the original free middle part of the main blade. Such an overlapping additional blade must be allowed to slide between the main blade and the next additional blade of the layer when under load as shown in the drawings. In using this arrangement the capacity of the spring, instead of being bound to the strength of the main blade, can be doubled or trebled without interfering with the principle of the invention, or with the determined place where the bending has to take place.

What I claim is:

1. In a vehicle truck or undercarriage, a rigid longitudinal frame beam having depending flanges at the sides thereof, a hollow pedestal fixed at its upper end to the beam intermediate the ends of the beam and adapted for the reception of a king pin on the vehicle to swivel the beam thereto, a longitudinally extending laminated spring arranged beneath the beam and pedestal, fastening means rigidly clamping the leaves of the spring at its center together and to the bottom of the pedestal, said spring having arms extending forwardly and rearwardly from the pedestal, brackets fastened to and clamping the leaves of the spring arms together at points spaced from said fastening means so as to leave the intervening unclamped portions of the arms free to form fulcra on which the arms may flex and oscillate in a vertical plane, front and rear transverse wheel axles mounted on the brackets, cheek plates fixed to and projecting upwardly from the free ends of the arms and engageable with the side flanges of the beam to permit the spring arms to oscillate vertically while preventing lateral oscillation thereof relative to the beam, and coacting stop and cushioning means on the beam and pedestal and between the same and the cheek plates for limiting the vertical oscillations of the spring arms.

2. In a vehicle truck or undercarriage, a rigid longitudinal frame beam having depending flanges at the sides thereof, a hollow pedestal fixed at its upper end to the beam intermediate the ends of the beam and adapted to receive a king pin on the vehicle to swivel the beam thereto, a longitudinally extending laminated spring arranged beneath the beam and pedestal, fastening means rigidly securing the plates of the spring at its center together and to the bottom of the pedestal, said spring having arms extending forwardly and rearwardly from the pedestal, brackets fastened to and uniting the plates at the free ends of the spring arms and spaced from said fastening means so as to leave the intervening portions of the arms free to flex and form fulcra on which the arms may oscillate in a vertical plane, front and rear wheel axles pivotally supported by the brackets for oscillation each about an axis extending longitudinally of the vehicle, pairs of cheek plates projecting upwardly from and at the sides of the brackets and lying in front and rear of the pedestal and slidably engaging the side flanges of the beam to permit the spring arms to oscillate vertically while preventing lateral oscillation thereof relative to the beam, a transverse member connecting the upper ends of the cheek plates of each pair, and coacting stop and cushioning means on the beam and pedestal and between the transverse member of each pair of cheek plates and the pedestal for limiting the vertical oscillations of the spring arms.

3. In a vehicle truck or undercarriage, a rigid longitudinal, channeled frame beam embodying a top plate and side plates depending therefrom, a hollow pedestal at the center of the beam adapted to receive a king pin on the vehicle to swivel the beam thereto, said pedestal being fixed at its upper end to the top plate of the beam and extending downwardly between and below the side plates of the beam, a laminated longitudinally extending spring arranged beneath the beam and pedestal, said spring having arms extending forwardly and rearwardly from the pedestal, fastening means rigidly securing the leaves of the spring at its center together and to the bottom of the pedestal, brackets fastened to and uniting the leaves of the arms of the spring at points spaced from said fastening means so as to leave the intervening portions of the arms free to flex and form fulcra on which the arms may oscillate in a vertical plane, front and rear wheel axles pivotally mounted on the brackets to oscillate each about an axis extending longitudinally of the vehicle, pairs of cheek plates projecting upwardly from the sides of the brackets and lying in front and rear of the pedestal and slidably engaging the side plates of the beam to permit the spring arms to move vertically while preventing lateral oscillation thereof relative to the beam, a transverse member connecting the cheek plates of each pair at their upper ends, and coacting stop and cushioning means on the beam and pedestal and between the pedestal and transverse members of the cheek plates for limiting the vertical oscillations of the spring arms.

4. In a vehicle truck or undercarriage, a rigid longitudinal, channeled frame beam including a top plate and depending side plates, a hollow pedestal fixed at its upper end to the top plate of the beam intermediate the ends of the beam and extending downwardly between the side plates of the beam and adapted to receive a king pin on the vehicle to swivel the beam to the vehicle, a longitudinally extending laminated spring arranged beneath the beam and pedestal and comprising a central bank of spring leaves and front and rear end banks of spring leaves connected by a main spring leaf extending uninterruptedly between the three banks of leaves, fastening means rigidly securing the central bank of leaves of the spring to the bottom of the pedestal, a bracket at each end of the spring fastening the leaves of the bank at its end of the spring together, front and rear wheel axles pivotally mounted on the brackets to oscillate laterally each about an axis extending longitudinally of the truck frame, the said end banks and intervening portions of the main leaf between the same and the central bank forming front and rear spring arms including portions composed of a lesser number of leaves from the banks and forming fulcra on which the arms are adapted to flex and oscillate in a vertical plane as the wheels rise and fall due to inequalities of surfaces on which they travel, cheek plates project upwardly at the sides of the brackets between and slidably engaging the side plates of the beam to permit the spring arms to oscillate vertically while preventing lateral oscillations thereof relative to the beam, and coacting stop and cushioning means on the beam and pedestal and between the same and the cheek plates for limiting the vertical oscillations of the spring arms.

5. In a vehicle truck or undercarriage, a rigid longitudinal frame beam having depending flanges at the sides thereof, a hollow pedestal fixed at its upper end to the beam intermediate the ends of the beam and adapted to receive a king pin on the vehicle to swivel the beam to the vehicle, a longitudinally extending laminated spring arranged beneath the beam and pedestal and comprising a central bank of spring leaves and front and rear end banks of spring leaves connected by a main spring leaf extending uninterruptedly between the three banks of leaves, fastening means rigidly securing the central bank of leaves of the spring to the bottom of the pedestal, front and rear brackets respectively fastened to and rigidly fastening the leaves of the front and rear banks of leaves of the spring together, front and rear wheel axles respectively supported by the front and rear brackets and each pivotally mounted on its supporting bracket to oscillate about a longitudinal axis, the said end banks and the intervening portions of the main leaf between the same and the central bank forming front and rear spring arms including portions of a lesser number of leaves than the banks and forming fulcra on which the arms are adapted to flex and oscillate in a vertical plane as the wheels rise and fall due to inequalities of surfaces on which they travel, cheek plates projecting upwardly from the brackets and slidably engaging the side flanges of the beam to permit the spring arms to oscillate vertically while preventing lateral oscillations thereof relative to the beam, and coacting stop and cushioning means on the beam and pedestal and between the same and the cheek plates for limiting the vertical oscillations of the spring arms.

6. In a vehicle truck or undercarriage, a rigid longitudinal, channeled frame beam embodying a top plate and side plates depending therefrom, a hollow pedestal at the center of the beam fixed at its upper end to the top plate thereof and extending downward between and below the side plates thereof, a longitudinally extending laminated spring arranged beneath the beam and pedestal, said spring having arms extending forwardly and rearwardly from the pedestal, fastening means rigidly securing the leaves of the spring at its center to the bottom of the pedestal, front and rear brackets fastened to and uniting the leaves of the arms of the spring at points spaced from said fastening means so as to leave the intervening portions of the spring free to form fulcra on which the arms may flex and oscillate in a vertical plane, front and rear wheel axles respectively supported by the front and rear brackets and each pivotally mounted on its supporting bracket to oscillate about a longitudinal axis, cheek plates projecting upwardly from the brackets and slidably engaging the side plates of the beam to permit the spring arms to oscillate vertically while preventing lateral oscillation thereof relative to the beam, and coacting stop and cushioning means on the beam and pedestal and between the same and the cheek plates for limiting the vertical oscillations of the spring arms.

7. In a vehicle truck or undercarriage, a rigid longitudinal, channeled frame beam embodying a top plate and side plates depending therefrom, a hollow pedestal at the center of the beam adapted to receive a king pin on the vehicle to swivel the beam thereto, said pedestal being fixed at its upper end to the top plate of the beam and extending downward between and below the side plates of the beam, a longitudinally extending laminated spring arranged beneath the beam and pedestal, said spring having arms extending forwardly and rearwardly from the pedestal, fastening means rigidly securing the leaves of the spring at its center to the bottom of the pedestal, front and rear brackets fastened to and uniting the leaves of the arms of the spring at points spaced from said fastening means so as to leave the intervening portions of the arms free to form fulcra on which the arms may flex and oscillate in a vertical plane, front and rear wheel axles respectively supported by the front and rear brackets and each pivotally mounted on its supporting bracket to oscillate about a longitudinal axis, cheek plates projecting upwardly from the brackets and slidably engaging the side plates of the beam to permit the spring arms to move vertically and to prevent lateral oscillation thereof relative to the beam, cushioning and stop means on the beam adapted to be engaged by the upper ends of the cheek plates on their movements away from the pedestal, and cushioning and stop means on the pedestal and upper ends of the cheek plates including horizontally arranged springs adapted to yieldingly resist movements of the cheek plates toward the pedestal.

HENRI W. JONKHOFF.

REFERENCES CITED

The following references are of record in the file of this patent:

UNITED STATES PATENTS

| Number | Name | Date |
|---|---|---|
| 1,166,615 | Mason et al. | Jan. 4, 1916 |
| 1,623,422 | Loveloy | Apr. 5, 1927 |
| 2,027,913 | Kneale | Jan. 14, 1936 |
| 2,058,955 | Culemeyer | Oct. 27, 1936 |
| 2,121,862 | Dodge | June 28, 1938 |
| 2,250,554 | Schroeder | July 29, 1941 |
| 2,253,407 | Wallace | Aug. 19, 1941 |
| 2,343,872 | Low | Mar. 14, 1944 |

FOREIGN PATENTS

| Number | Country | Date |
|---|---|---|
| 499,364 | Great Britain | Jan. 23, 1939 |
| 527,263 | Great Britain | Oct. 4, 1940 |